United States Patent
Beier et al.

(10) Patent No.: US 9,010,503 B2
(45) Date of Patent: Apr. 21, 2015

(54) PNEUMATIC WHEEL BRAKE FOR A VEHICLE

(75) Inventors: Peter Beier, Wunstorf (DE); Olaf Jantz, Hannover (DE)

(73) Assignee: WABCO GmbH, Hannover (DE)

( * ) Notice: Subject to any disclaimer, the term of this patent is extended or adjusted under 35 U.S.C. 154(b) by 168 days.

(21) Appl. No.: 13/704,671

(22) PCT Filed: Mar. 10, 2011

(86) PCT No.: PCT/EP2011/001174
§ 371 (c)(1),
(2), (4) Date: Dec. 17, 2012

(87) PCT Pub. No.: WO2011/160736
PCT Pub. Date: Dec. 29, 2011

(65) Prior Publication Data
US 2013/0087419 A1 Apr. 11, 2013

(30) Foreign Application Priority Data
Jun. 26, 2010 (DE) .......................... 10 2010 025 232

(51) Int. Cl.
*F16D 65/16* (2006.01)
*F16D 65/18* (2006.01)
(Continued)

(52) U.S. Cl.
CPC ............ *F16D 65/16* (2013.01); *F16D 2121/08* (2013.01); *F16D 51/00* (2013.01); *F16D 55/226* (2013.01); *F16D 65/18* (2013.01); *F16D 2121/02* (2013.01); *F16D 2121/24* (2013.01); *F16D 2123/00* (2013.01); *F16D 2125/36* (2013.01); *F16D 2125/582* (2013.01); *B60T 1/06* (2013.01)

(58) Field of Classification Search
CPC ............ F16D 2123/00; F16D 2121/08; F16D 2121/24
USPC ................... 188/72.7–72.8, 106 F, 71.1–71.8
See application file for complete search history.

(56) References Cited

U.S. PATENT DOCUMENTS 4,180,146 A * 12/1979 Airheart ....................... 188/71.8
6,505,714 B1    1/2003 Ward
(Continued)

FOREIGN PATENT DOCUMENTS

DE    10 2005 005 250 A1    9/2005
DE    10 2005 022 404 A1    11/2006
(Continued)

*Primary Examiner* — Anna Momper
(74) *Attorney, Agent, or Firm* — Kramer Levin Naftalis & Frankel LLP

(57) ABSTRACT

A pneumatic wheel brake for a vehicle includes a brake lever operable by a compressed air cylinder, and a brake application device operable by the lever. Employing the brake application device, a first brake element can be pressed against a second when the lever is operated. The wheel brake also includes an actuating device, which can be motor driven, which force can be applied to parts of the brake application device, at least when the lever is not operated, to press the first brake element against the second. The wheel brake also has a spring accumulator element arranged outside the compressed air cylinder. Force can be applied to the spring accumulator element by the actuating device; and force can be applied to parts of the brake application device by the spring accumulator element, at least when the lever is not operated. Thereby, the first brake element can be pressed against the second.

4 Claims, 7 Drawing Sheets

(51) Int. Cl.
- *F16D 51/00* (2006.01)
- *F16D 55/226* (2006.01)
- *B60T 1/06* (2006.01)
- *F16D 121/08* (2012.01)
- *F16D 121/02* (2012.01)
- *F16D 121/24* (2012.01)
- *F16D 123/00* (2012.01)
- *F16D 125/36* (2012.01)
- *F16D 125/58* (2012.01)

(56) References Cited

U.S. PATENT DOCUMENTS

| | | |
|---|---|---|
| 6,948,595 B2 | 9/2005 | Audren et al. |
| 7,152,716 B2 * | 12/2006 | Taylor et al. ............... 188/71.8 |
| 7,374,026 B2 | 5/2008 | Taylor et al. |
| 7,614,483 B2 | 11/2009 | Klingner et al. |
| 2006/0124406 A1 * | 6/2006 | Baumgartner ............... 188/71.8 |
| 2008/0217117 A1 | 9/2008 | Severinsson et al. |
| 2008/0283345 A1 | 11/2008 | Balz et al. |
| 2009/0200120 A1 * | 8/2009 | Baumgartner et al. ...... 188/72.2 |
| 2011/0209952 A1 * | 9/2011 | Baumgartner et al. ...... 188/72.2 |

FOREIGN PATENT DOCUMENTS

| | | |
|---|---|---|
| DE | 699 31 453 T2 | 12/2006 |
| DE | 10 2005 027 915 A1 | 1/2007 |
| DE | 60 2005 003 162 T2 | 12/2007 |
| DE | 10 2008 009 161 A1 | 9/2008 |
| DE | 10 2007 043 968 A1 | 1/2009 |
| EP | 1 384 913 A2 | 1/2004 |
| WO | WO 2007/051809 A1 | 5/2007 |

* cited by examiner

PNEUMATIC WHEEL BRAKE FOR A VEHICLE

FIELD OF THE INVENTION

The present invention generally relates to a pneumatic wheel brake for a vehicle.

BACKGROUND OF THE INVENTION

A generic pneumatic wheel brake is disclosed in EP 1 384 913 B1, which proposes a second expansion device in addition to a first expansion device. The second expansion device is part of an electrically actuated brake application device. Thus, a parking brake function may be implemented with a reduced space requirement, in particular because a long combination cylinder does not have to be used as a pneumatic actuating cylinder, but a simple, short brake cylinder may be used.

In the electrically actuatable parking brake function described in EP 1 384 913 B1, after engaging the parking brake, i.e., after parking the vehicle, in particular when the brakes are heated, it is necessary to compensate for a reduction in the braking force of the parking brake function, as a result of the brakes being cooled, by a resetting procedure by means of the electrical brake application device, in order to ensure secure braking of the vehicle. Such resetting by means of the electrical brake application device, however, may be undesirable, for example when electrical energy is to be saved.

SUMMARY OF THE INVENTION

Generally speaking, it is an object of the present invention to provide a pneumatic wheel brake with an electrically actuatable parking brake function that, after parking the vehicle, ensures secure braking of the vehicle without further consumption of electrical energy.

It will be appreciated that an advantage of the invention is that, by providing a spring accumulator element, resetting and/or retensioning via the actuating device, which may be driven by electric motor, is not required when the vehicle is parked. Thus, the consumption of electrical energy when the vehicle is parked, within the context of the parking brake function, may be entirely avoided. By means of the spring accumulator element, contraction in the braking mechanism as a result of cooling is automatically compensated for.

A further advantage is that service brake cylinders of simple construction without a spring accumulator element may be used as compressed air cylinders, i.e., a long, combination cylinder is not necessary.

An electrically actuatable parking brake function may be implemented via the actuating device. Advantageously, the spring accumulator element is subjected to force by the actuating device. As a result, the spring accumulator element is located in the power flow with the actuating device, such that the spring accumulator element itself is able to exert a brake application force onto a first braking element, and additionally the spring accumulator element may be pretensioned by the actuating device to a specific pretensioning force. This permits a cost-effective and compact implementation of a parking brake function, which may be actuated electrically for a pneumatic wheel brake, for example in the form an electromechanical hand brake (EMH).

Thus, the first braking element may be subjected to a brake application force both from the actuating device and from the spring accumulator element.

According to an embodiment of the invention, the actuating device is used for compensating air play.

According to another embodiment, the actuating device, which may be driven by electric motor when actuating the brake lever, i.e., when the compressed air cylinder is subjected to pressure, is not, or not fully, subjected to the forces thus produced. The actuating device is arranged outside the main power flow produced when the wheel brake is applied via the compressed air cylinder, and thus not subjected to the load of the relatively high brake application forces that occur during the braking process. As the actuating device serves for the parking brake function and optionally serves for the compensation of air play, the actuating device may be constructed to have a reduced load-bearing capacity than if it were located in the main power flow, as proposed in EP 1 384 913 B1. Thus, depending on the design of the brake system for the parking brake function, in a heavy utility vehicle of conventional design, a brake application force of 120 kN may be required, for example, while the maximum braking force present during actuation of the service brake may be approximately 230 kN. According to the reduced load bearing capacity, the actuating device may thus be constructed using more simple components that do not have a high load-bearing capacity, and, as a result, it can be configured to be more compact and more lightweight overall.

According to a further embodiment of the invention, the spring accumulator element, as set forth above for the actuating device, is not located in the main power flow of the service brake function of the wheel brake. So, when the brake lever is actuated, the spring accumulator element is not, or not fully, subjected to the forces produced thereby. Accordingly, the spring accumulator element may also be designed for the lower loads that are present for the parking brake function, i.e., configured to be correspondingly smaller and more lightweight than if it were arranged in the main power flow.

According to another embodiment, the spring accumulator element may be pretensioned to a pretensioning force by the actuating device. This has the advantage that the actuating device, which may be driven by electric motor when receiving a parking brake actuating signal, is accordingly able to subject the spring accumulator element to a pretensioning force, "in reserve" so to speak, so that after parking the vehicle as a result of sufficient pretensioning force, the spring accumulator element automatically effects secure braking of the vehicle in the context of the parking brake function.

According to yet another embodiment of the invention, the spring accumulator element is configured as a disk spring. This has the advantage that a small component of compact construction may be used as a spring accumulator element, so that the components required for implementing the parking brake function may be integrated in a very compact manner overall in the wheel brake. Additionally, by the use of a disk spring, a favorable path/force characteristic curve of the spring is produced for resetting the parking brake function when the vehicle is parked. In particular, when setting a corresponding pretensioning force, the substantially horizontally extending part of the characteristic curve of a disk spring may be utilized, in which the force output by the spring does not change or changes only insignificantly over the path.

According to a further embodiment, the actuating device is coupled via a variable gear mechanism to the brake application device. The variable gear mechanism may comprise, in particular, a ball-ramp arrangement. The use of a variable gear mechanism has the advantage that a variable gear ratio of the gear mechanism may be implemented over the actuating path of the actuating device. Thus, in particular at the start of the actuating movement of the actuating device, a higher gear ratio may be provided and subsequently a reducing gear ratio. As a result, the available actuating force of the actuating device may be used particularly expediently and efficiently to apply the brake in the context of the parking brake function by the gear ratio being reduced, in particular with increased brake application force via the variable gear mechanism, so that even with an actuating device provided with a relatively low-powered electric motor, a high brake application force of the parking brake function may be implemented.

According to another embodiment, when the brake lever is actuated, the variable gear mechanism is not, or not fully, subjected to forces produced thereby. As a result, the variable gear mechanism is not arranged in the main power flow of the service brake function and not subjected, or only slightly subjected, to this power flow. Accordingly, the variable gear mechanism may also be produced with components that have a reduced load-bearing capacity and that are configured to be more simple, more cost-effective and more lightweight. In particular, in the case of a ball-ramp arrangement, use is made of smaller balls, so that the constructional space required for the variable gear mechanism may be minimized further.

According to a still further embodiment, the variable gear mechanism has a degressive path characteristic curve in the direction of the brake application. This has the advantage that, in the direction of the brake application, the actuating device may initially deliver an actuating path with a higher gear ratio, and in the course of the actuating movement may deliver an actuating path with a diminishing gear ratio. As a result, overall, greater maximum brake application forces of the parking brake function may be implemented than with a linear or progressive path characteristic curve.

According to another embodiment, the actuating device may be connected to a switchable coupling device, via which the actuating device may be selectively coupled to the brake application device or disconnected therefrom. The switchable coupling device has the advantage that the actuating device may be optionally used for various functions, in particular for a direct application of the wheel brake in the context of the parking brake function, for compensating for air play and specific pretensioning of the spring accumulator element to a desired pretensioning force. In an advantageous embodiment, the switchable coupling device is arranged between the actuating device and the parts of the brake application device used for the parking brake function, i.e., the actuating device is permanently connected to the spring accumulator element.

According to a further embodiment, the variable gear mechanism may be locked by the switchable coupling device. This makes it possible to lock the variable gear mechanism by means of the coupling device and thus neutralize the variable gear mechanism relative to its transmission function. In this state, the actuating movement provided by the actuating device may be transmitted directly and without gearing to the parts of the brake application device that may be actuated by the actuating device. By unlocking the variable gear mechanism by means of the switchable coupling device, however, the actuating device is decoupled from the parts of the brake application device. In this state, the variable gear mechanism becomes effective, i.e., via the variable gear mechanism a variable transmission of the actuating path provided by the actuating device takes place, depending on the actuating position.

According to yet another embodiment of the invention, the wheel brake additionally comprises the compressed air cylinder.

According to an embodiment of a method for securing a vehicle comprising a pneumatic wheel brake of the type described above:

a) when receiving a parking brake actuating signal, the actuating device is actuated in the direction of the application of the wheel brake, whereby the actuating device is coupled by the coupling device to the brake application device, b) when reaching a first predetermined actuating position and/or brake application force, the actuating device is disconnected from the brake application device by the coupling device, whereby the actuating device is actuated further in the direction of the application of the wheel brake, and c) when reaching a second predetermined actuating position and/or brake application force, the actuating device is switched off.

For activating the parking brake function, the previously described sequence is carried out in reverse. Initially, the actuating device is actuated by the open coupling device counter to the direction of the brake application. When reaching a predetermined actuating position and/or brake application force, the coupling device is closed and the actuating device is actuated counter to the direction of the brake application until the parking brake function is lifted.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is described in more detail hereinafter with reference to exemplary embodiments depicted in the appended drawings, in which.

The same reference numerals are used for corresponding elements in the figures.

DETAILED DESCRIPTION OF THE PREFERRED EMBODIMENTS

Figure 1:
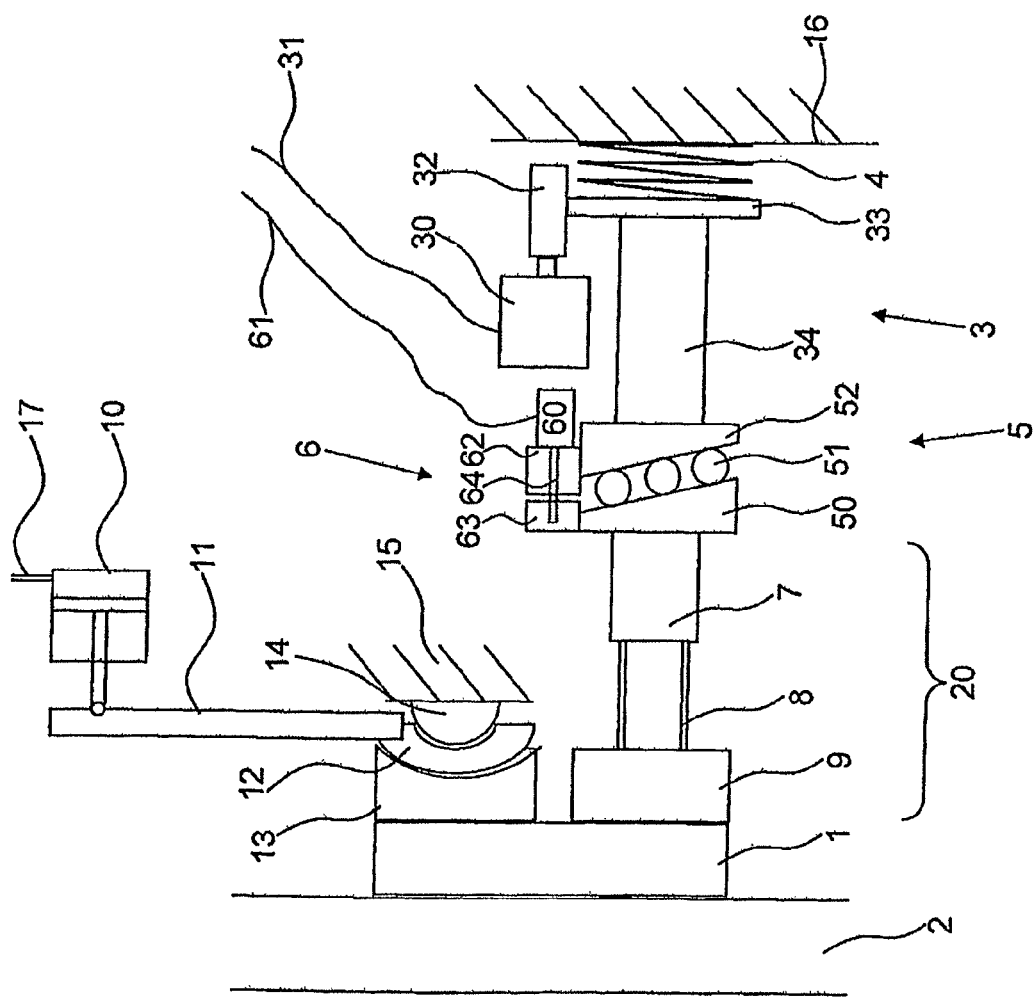
FIG. 1 is a schematic view of a pneumatic wheel brake for a vehicle in accordance with an embodiment of the present invention.

FIG. 1 shows a pneumatic wheel brake for a vehicle including a compressed air cylinder 10 and a brake application device 20 connected to the compressed air cylinder 10 and able to be actuated by the compressed air cylinder 10. The brake application device 20 comprises a brake lever 11, which comprises at its end remote from the point of application of the compressed air cylinder 10 an actuating element 12 provided with an actuating contour, which may be configured, for example, in the form of an eccentric or a camshaft. The actuating element 12 acts on a first pressure part 13 configured with a correspondingly opposing contour, which ultimately acts on a first braking element in the form of a brake lining 1. The actuating element 12 is supported to the rear via a bearing element 14 on a component of the wheel brake fixed to the housing, for example a brake cover 15.

By actuating the compressed air cylinder 10, which is effected by filling a compressed air chamber with compressed air via a compressed air line 17, the compressed air cylinder 10 exerts via a piston rod an actuating force on the brake lever 11. As a result, the brake lever 11 is actuated in the direction of the brake application. Via the actuating element 12 and the pressure part 13, a brake application force is exerted on the brake lining 1. As a result, the brake lining 1 is pressed against a second brake element in the form of a brake disk 2. Alternatively, the wheel brake may also be configured as a drum brake. In this case, the second brake element is configured as a brake drum.

The brake application device further comprises a spindle nut 7, a threaded spindle 8, which may be rotated in the spindle nut, and a second pressure part 9 connected to the threaded spindle 8. The second pressure part 9, as in the case of the first pressure part 13, is in contact with the brake lining 1 and may, with appropriate rotation of the spindle nut 7, exert relative to the threaded spindle 8 a brake application force on the brake lining 1.

The parts 7, 8, 9 of the brake application device 20 are conventionally configured to be integrated in modern wheel brakes with the first pressure part 13. In this case, the spindle nut 7 and the threaded spindle 8 serve to compensate for the length as a result of wear of the brake lining, via an integrated mechanical resetting device. In this case, the first pressure part 13 is advantageously configured to be integrated as a single component with the second pressure part 9. Additionally, the threaded spindle 8 and/or the spindle nut 7 are passed through an opening of the actuating element 12. For a clearer view, the elements of this arrangement in FIG. 1, however, are shown adjacent to one another.

The spindle nut 7 is coupled fixedly in terms of rotation to an output element 50 of a variable gear mechanism 5 configured in the form of a ball-ramp arrangement. The variable gear mechanism 5 comprises, in addition to the output element 50, a drive element 52 as well as balls 51 arranged between the drive element and the output element. Advantageously, three balls 51 are provided, arranged uniformly over the periphery of the drive element and/or output element 50, 52. As a result, in a simple manner, a statically determined transmission of force may be carried out from the drive element 52 to the output element 50.

A switchable coupling device 6 is fastened to the variable gear mechanism 5. The switchable coupling device 6 comprises an output coupling part 63 connected to the output element 50 and a drive coupling part 62 connected to the drive element 52. For producing an electrically actuatable switching function, the coupling device 6 comprises an electromagnet 60 fastened, for example, to the drive coupling part 62, via which a coupling pin 64 may be retracted and extended. When the coupling pin 64 is extended, the drive coupling part 62 is connected fixedly in terms of rotation to the output coupling part 63. As a result, the variable gear mechanism 5 is locked, i.e., the drive element 52 is connected fixedly in terms of rotation to the output element 50. The electromagnet 60 is able to be actuated via an electrical cable 61.

A transmission shaft 34 of an actuating device 3, which may be driven by electric motor, is connected fixedly in terms of rotation to the drive element 52 of the variable gear mechanism 5. The transmission shaft 34 is connected fixedly in terms of rotation at its end remote from the drive element 52 to a gearwheel 33. The gearwheel 33 is in contact with a pinion 32. The pinion 32 is connected to an electric motor 30. The electric motor 30 is able to be actuated via an electric cable 31. The pinion 32 and the gearwheel 33 form a gear mechanism. In this case, the pinion 32 is of relatively long configuration, in order to be able to accommodate positional alterations of the gearwheel 33 in the longitudinal direction of the transmission shaft 34 during operation of the actuating device 3.

On the side of the gearwheel 33 remote from the transmission shaft 34, a spring accumulator element 4 is arranged which, optionally decoupled via a bearing, is clamped between the gearwheel 33 and a stop 16 of the wheel brake fixed to the housing.

As shown in FIG. 1, the coupling device 6, the variable gear mechanism 5, the actuating device 3, as well as the spring accumulator element 4 are arranged outside the power flow of the parts of the brake application device, which may be acted upon by the compressed air cylinder 10, so that the forces produced thereby do not act on the coupling device 6, the variable gear mechanism 5, the actuating device 3 and the spring accumulator element 4.

For activating the parking brake function, the wheel brake is actuated as follows according to FIG. 1.

Initially, when the coupling device 6 is closed, i.e., when the coupling pin 64 is extended, the electric motor 30 is actuated in the direction of the brake application. The rotational movement transmitted via the transmission shaft 34 is transmitted directly to the spindle nut 7 by the locked variable gear mechanism 5. As a result, the threaded spindle 8 and, thus, the second pressure part 9 move against the brake lining 1. The electric motor 30 in this operating state is operated for a sufficient length of time until the brake application force able to be produced thereby is at least approximately reached. Then, the coupling device 6 is opened, i.e., the coupling pin 64 is retracted. To this end, optionally the electric motor 30 is briefly stopped or actuated slightly counter to the direction of the brake application in order to relieve the load from the coupling device 6. As a result, the drive element 52 is decoupled from the output element 50, so that both parts are able to move toward one another. Then, the electric motor 30 is again actuated in the direction of the brake application. As a result, the transmission shaft 34 and the gearwheel 33 are moved to the right, due to an alteration in the length of the ball-ramp arrangement 5. As a result, the spring accumulator element 4 is tensioned further. At the same time, the brake application force exerted on the brake lining 1 is increased further via the further pressure part 9. When a sufficient pretensioning of the spring accumulator element 4 and/or a sufficient brake application force is reached, the electric motor 30 is switched off.

Figure 2:
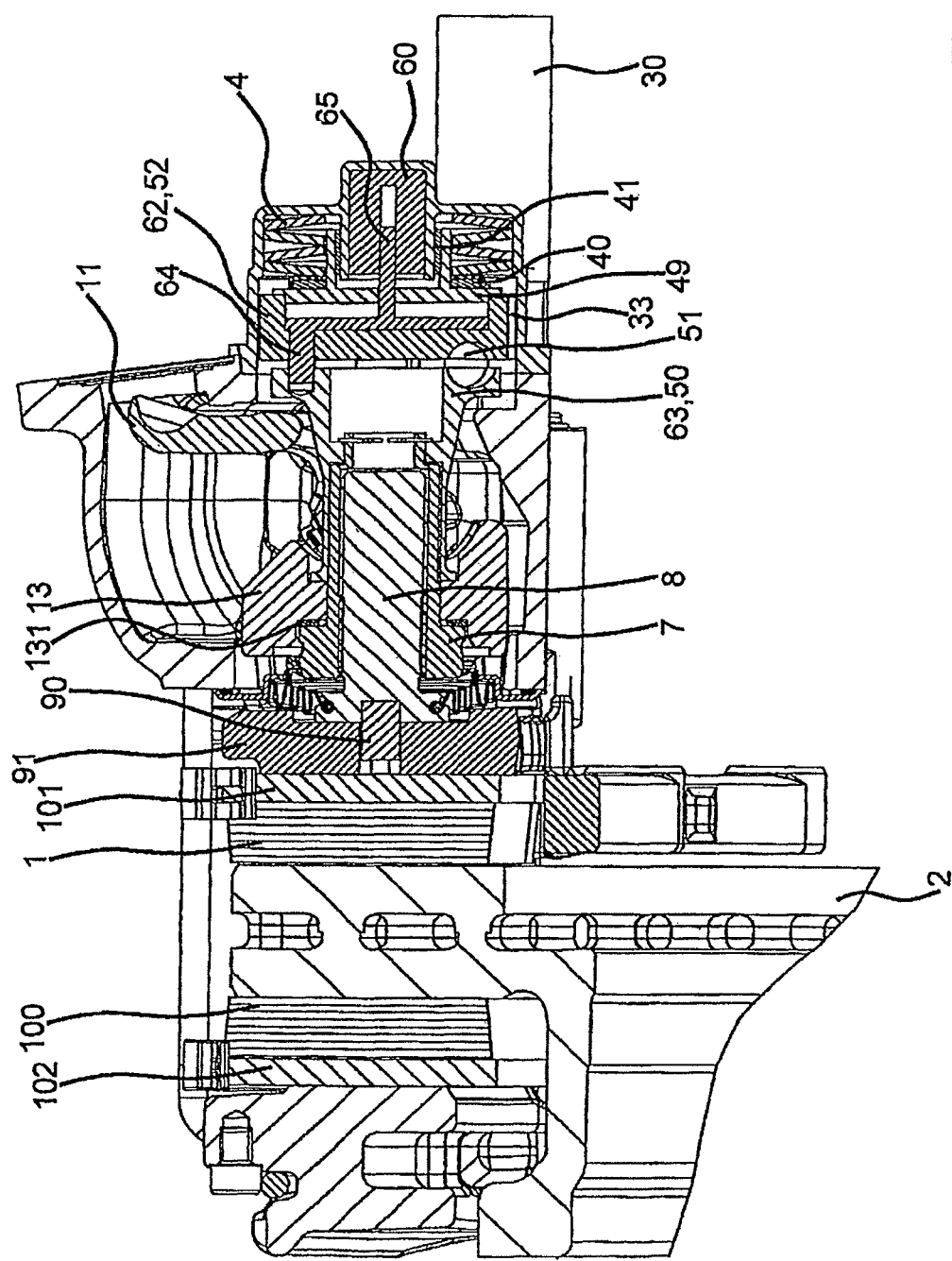
FIG. 2 is a lateral sectional view of a further embodiment of an inventive pneumatic wheel brake.

FIG. 2 shows a further embodiment of a pneumatic wheel brake for a vehicle, in which the elements described with reference to FIG. 1, in particular the brake application device, are designed to be structurally integrated with one another. The brake lever 11, the first pressure part 13, the spindle nut 7 and the threaded nut 8 are shown. The spindle nut 7 and the threaded spindle 8 are arranged in a through-opening of the first pressure part 13. The first pressure part 13 is mounted via a bearing 131 opposite the spindle nut 7.

The threaded spindle 8 is coupled to a pressure plate 91, via which the brake application force is ultimately transmitted via a backplate 101 of the brake lining 1 to the brake disk 2.

For absorbing the reaction force, a further brake lining 100 with a backplate 102 is arranged on the opposing side of the brake disk 2.

The threaded spindle 8 is connected fixedly in terms of rotation via a connecting element 90 to the pressure plate 91. Via the connecting element 90 undesired rotation of the threaded spindle 8 relative to the pressure plate 91 is prevented to ensure the desired relative rotation between the threaded spindle 8 and the spindle nut 7.

Also shown are the output element 50 of the variable gear mechanism 5 designed as a component comprising the output coupling part 63, a ball 51 of the ball-ramp arrangement of the variable gear mechanism 5, the extendable pin 64 and the drive element 52 of the variable gear mechanism 5 designed as a component comprising the drive coupling part 62. Additionally, the gearwheel 33 is also configured to be integrated with the drive element 52, namely, in the form of an external toothing provided on the outside of the drive element 52. As a result of the integration of the gearwheel 33 with the drive element 52, the transmission shaft 34 as a separate component is dispensed with. The drive element 52 is mounted via a bearing cover 49 with a bearing 40 relative to the spring accumulator element 4 in the axial direction. Additionally, the drive element 52 is mounted via the bearing cover 49 with a bearing 41 relative to the housing of the electromagnet 60 in the radial direction. Relative to the electromagnet 60, an armature 65 is shown, which, when actuating the electromagnet, penetrates therein and drives the pin 64. The electric motor 30 is also shown.

Figure 3:
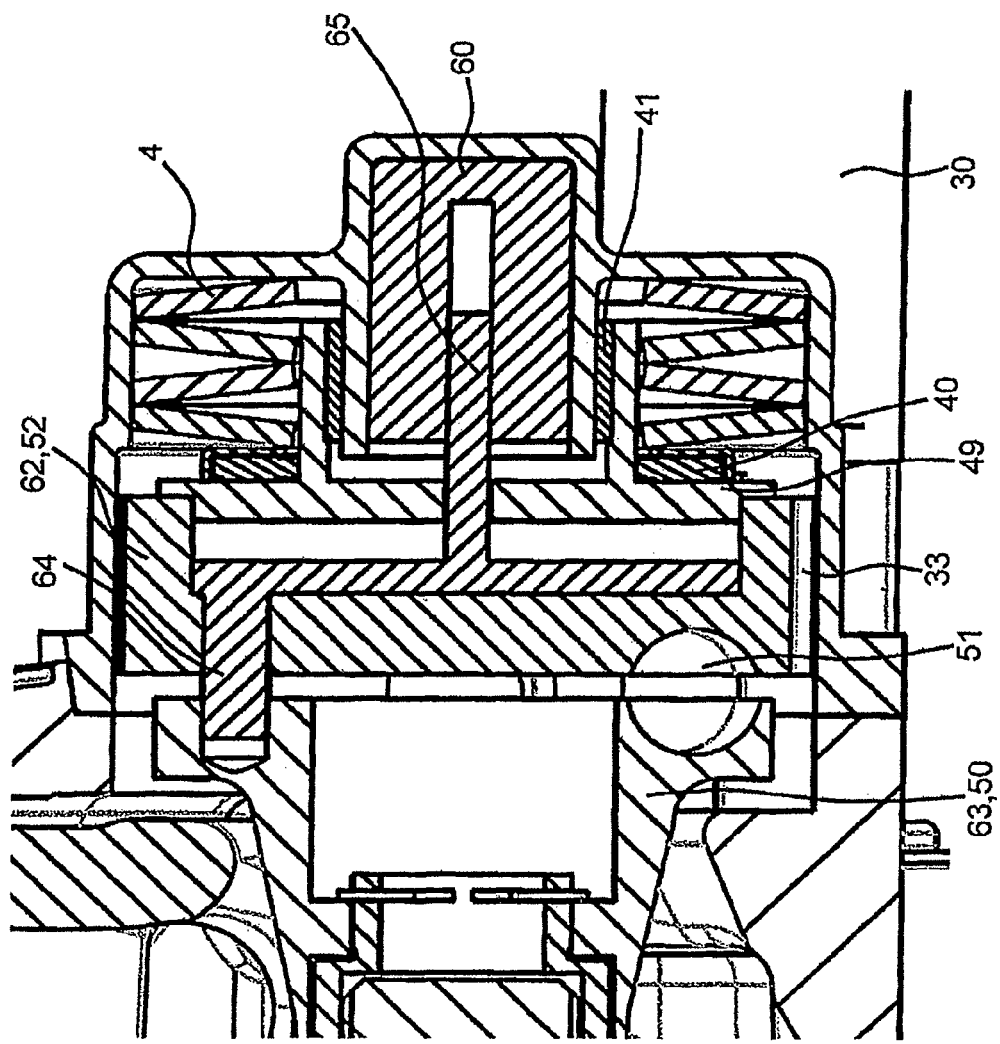
FIG. 3 is an enlarged view of FIG. 2 showing the coupling device, the variable gear mechanism and the spring accumulator element in detail.

FIG. 3 shows, in an enlarged view, the right-hand part of the wheel brake shown in FIG. 2 with the elements previously described.

Figure 4:
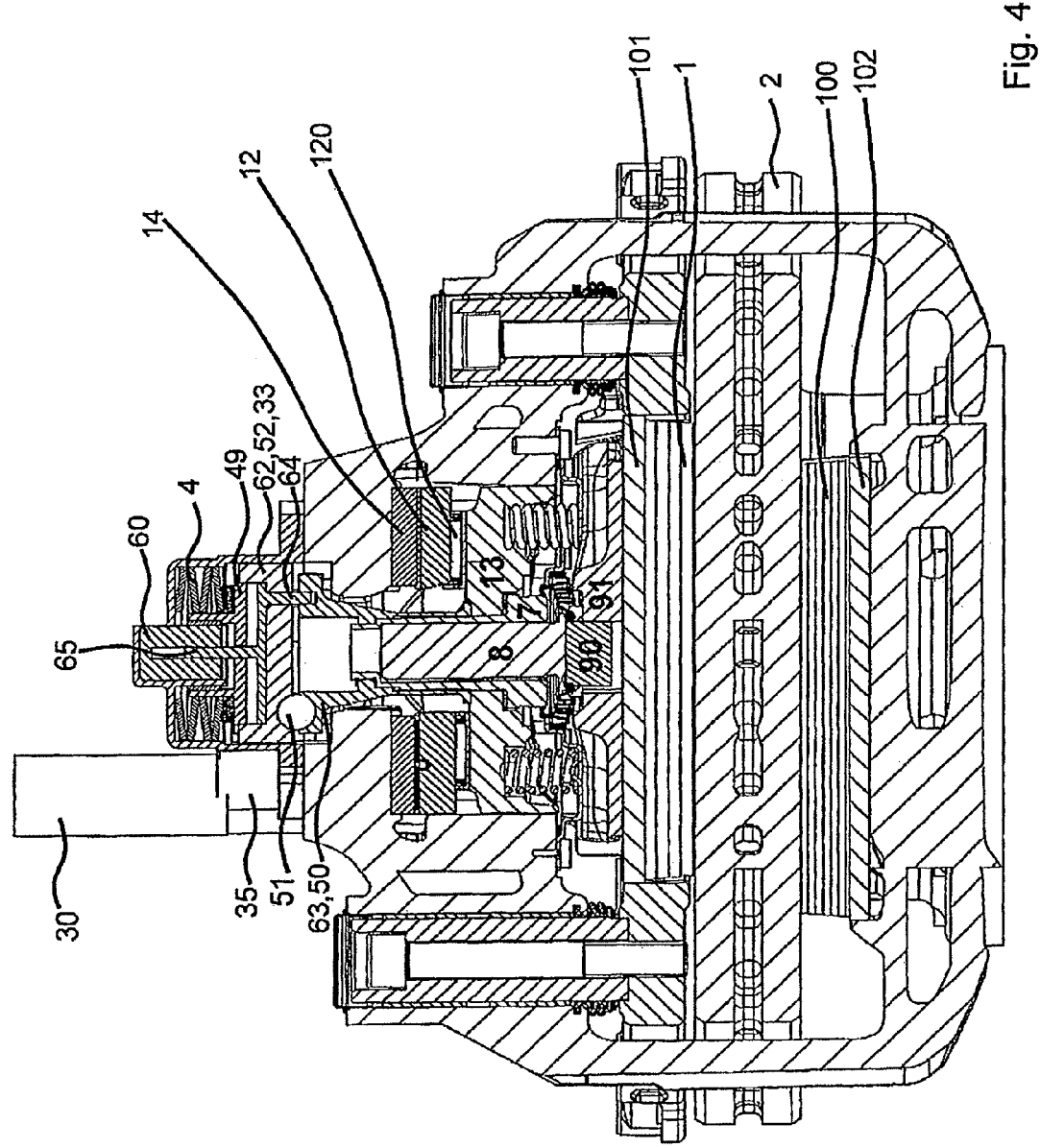
FIG. 4 is a sectional view from above showing the wheel brake according to FIGS. 2 and 3.

FIG. 4 shows the wheel brake according to FIGS. 2 and 3 from above. Also shown are the elements described with reference to FIGS. 2 and 3, which are provided with the same reference numerals in FIG. 4. Additionally in FIG. 4, a gear arrangement 35 is shown, which is connected to the electric motor 30 and the gearwheel 33. The gear arrangement 35 may be configured as a multi-stage gear mechanism and, in particular, may comprise the pinion 32. Also shown in FIG. 4 is the actuating element 12, the bearing element 14 as well as a bearing 120 arranged for minimizing friction between the actuating element 12 and the first pressure part 13.

Figure 5:
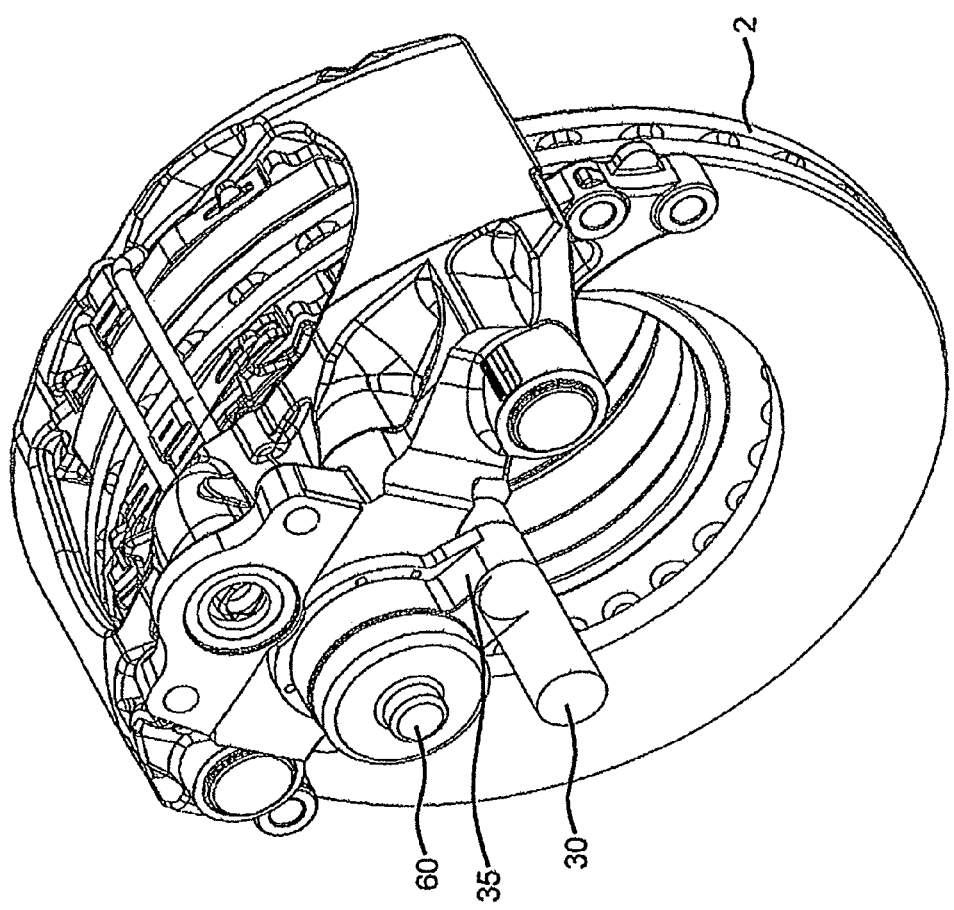
FIG. 5 shows the wheel brake according to FIGS. 2 to 4 in perspective.

FIG. 5 shows the wheel brake according to FIGS. 2 to 4 in perspective.

Figure 6:
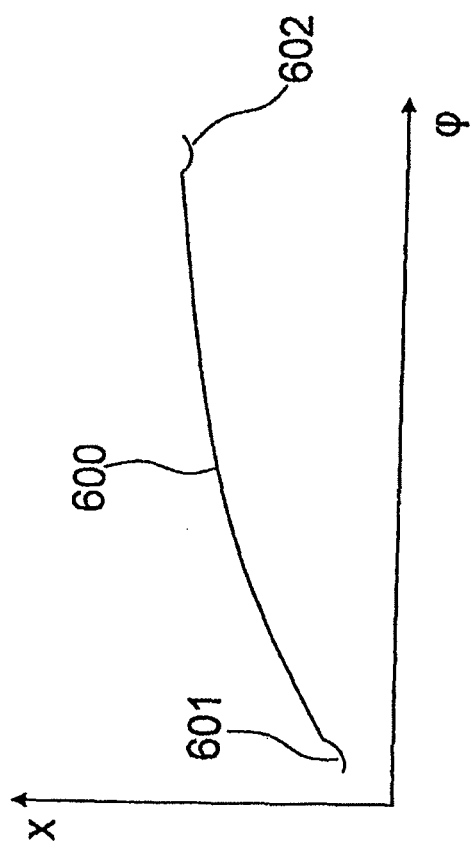
FIG. 6 shows the path of a contour of a variable gear mechanism according to an embodiment of the present invention.

FIG. 6 shows an advantageous path of the path characteristic curve of the variable gear mechanism 5. The path x produced by the gear mechanism 5 in the longitudinal direction of the transmission shaft 34 is shown over the rotational angle $\phi$ of the transmission shaft 34. As is shown, the characteristic curve has a degressive characteristic, i.e., it drops away in the direction of greater values of $\phi$. The characteristic curve shown in FIG. 6 at the same time corresponds to a profiled contour 600 of the ball-ramp arrangement, for example a degressive contour provided on the drive element 52 instead of the linear contour shown in FIG. 1. In this case, at the start and at the end of the contour 600, latching recesses 601, 602 are provided, in which the balls 51 may be engaged. As a result, the actuating device, which may be driven by electric motor 3, is relieved of load in the end positions of the contour 600.

Figure 7:
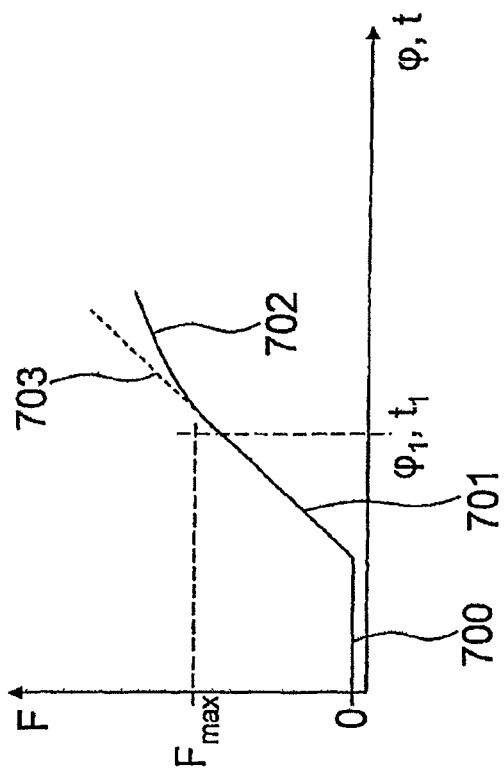
FIG. 7 illustrates the sequence for securing a vehicle with a pneumatic wheel brake according to an embodiment of the present invention.
Figure 7:
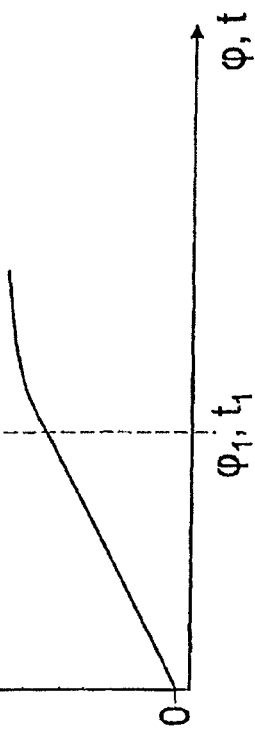

FIG. 7a shows a path of the brake application force F over the rotational angle $\phi$ of the transmission shaft 34. In FIG. 7b, the path of the actuating path x provided is shown in the direction of the brake application. The diagram, in principle, has the same characteristic for the actuating period t of the electric motor. Thus, the variables are indicated as alternatives in FIG. 7.

Based on an initial value 0, the electric motor 30 is actuated. In a first angular portion or time period 700, initially no brake application force is produced but possible air play is overcome. After overcoming the air play, in a time period 701, a rising linear brake application force, for example, is produced. At a time $t_1$ and/or at an actuating angle $\phi_1$, the coupling device 6 is opened. As a result, the transmission function of the variable gear mechanism 5 is activated. A rotation of the threaded spindle 8 relative to the spindle nut 7 substantially no longer takes place. The opening of the coupling device 6 takes place at a time before the maximum actuating force $F_{max}$ that is able to be delivered by the electric motor 30 is reached, i.e., before the electric motor 30 locks. The electric motor 30 is actuated further after opening the coupling device 6. As a result of the transmission of the variable gear mechanism 5, the force rises in a time period 702 with a reduced gradient, so that a further increase in the brake application force F is possible. The value $F_{max}$ indicates up to which value of the brake application force the electric motor could apply the brake when the coupling device 6 is closed. The line 703 indicates the theoretical further path of the line 701 when the coupling device 6 remains closed.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A method for securing a vehicle in a stationary state, the vehicle comprising a pneumatic wheel brake, the pneumatic wheel brake comprising at least one brake lever actuatable by a compressed air cylinder; a brake application device actuatable by the brake lever, the brake lever being configured to cause a first brake element to press against a second brake element when actuated; an actuating device by which parts of the brake application device are subjectable to force when the brake lever is in an unactuated state to permit the first brake element to be pressed against the second brake element; and a spring accumulator element arranged outside the compressed air cylinder, the spring accumulator element being subjectable to force by the actuating device, the parts of the brake application device being subjectable to force by the spring accumulator element when the brake lever is in the unactuated state to permit the first brake element to be pressed against the second brake element, the method comprising:

receiving a parking brake actuating signal;

actuating the actuating device in a direction of wheel brake application based on the parking brake actuating signal, the actuating device being coupled to the brake application device;

when at least one of a first predetermined actuating position and brake application force is reached, disconnecting the actuating device from the brake application device and further actuating the actuating device in the direction of wheel brake application; and switching off the actuating device when at least one of a second predetermined actuating position and brake application force is reached.

2. The method as claimed in claim 1, wherein the actuating device is drivable by electric motor.

3. The method as claimed in claim 1, wherein the pneumatic wheel brake further comprises a stop, and wherein the actuating device comprises a gearwheel and the spring accumulator element is disposed between the stop and the gearwheel.

4. The method as claimed in claim 3, wherein the spring accumulator element is subjectable to force by the gearwheel in the direction opposite the brake application direction and bears onto the stop in response to the force by the gearwheel.

* * * * *